G. BRAUCHLIN.
APPARATUS FOR MEASURING FABRICS.
APPLICATION FILED JAN. 21, 1907.
919,313.
Patented Apr. 27, 1909.
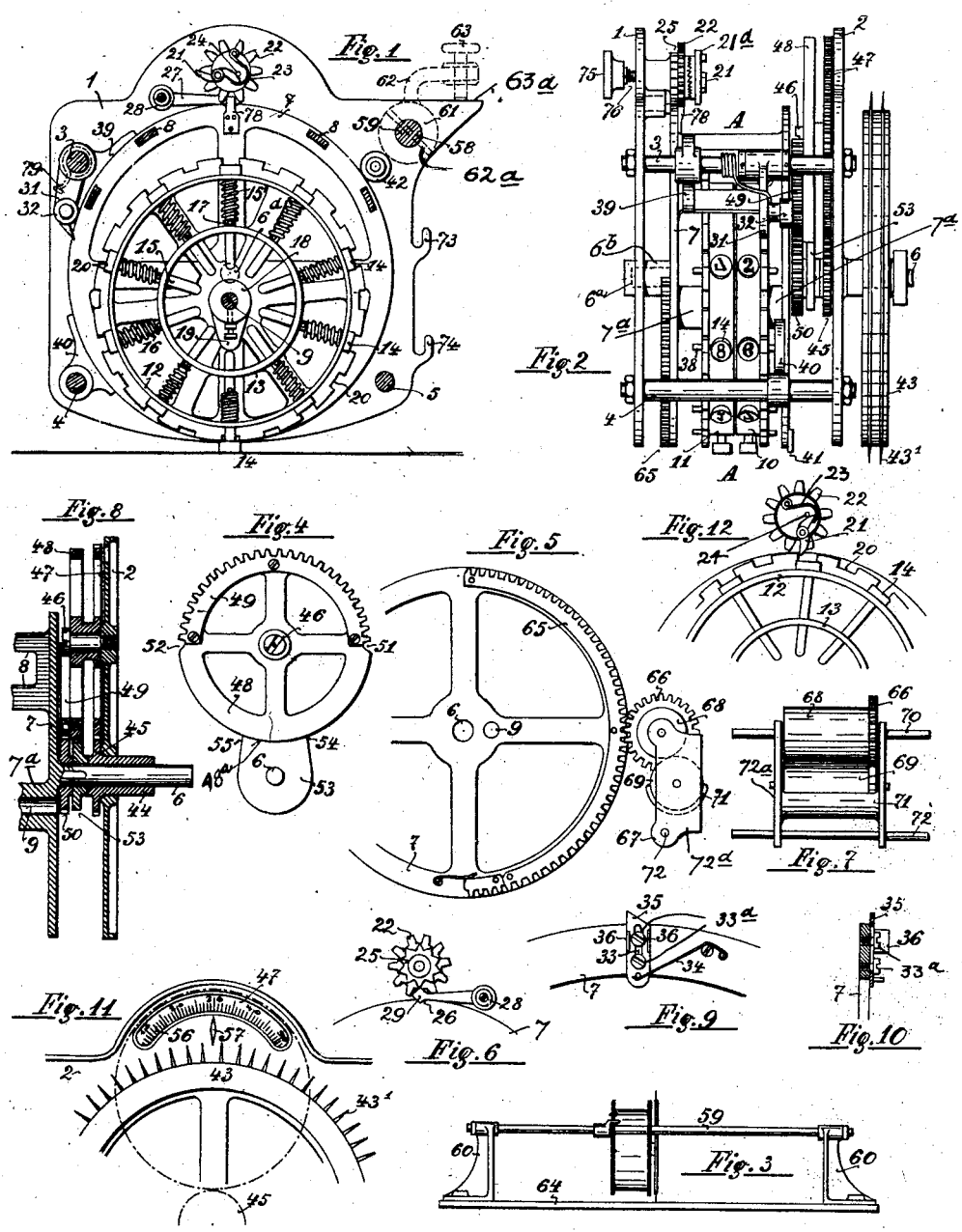

UNITED STATES PATENT OFFICE.

GOTTLIEB BRAUCHLIN, OF ZURICH, SWITZERLAND.

APPARATUS FOR MEASURING FABRICS.

No. 919,313.  Specification of Letters Patent.  Patented April 27, 1909.

Application filed January 21, 1907. Serial No. 353,306.

*To all whom it may concern:*

Be it known that I, GOTTLIEB BRAUCHLIN, a citizen of the Swiss Republic, residing at Zurich, in Switzerland, have invented certain new and useful Improvements in Apparatus for Measuring Fabrics, of which the following is a specification.

This invention relates to an improved apparatus for measuring fabrics and marking units of length thereon by means of typewheels arranged in a rotary box casing to which rotation is imparted at intervals for actuating said type-wheels, the measuring operation being performed by means of a measuring-wheel arranged with constant eccentricity relative to the type-wheels. The type, which is inked by a suitable device, is adjusted during the rotation of the box and the type which is to be impressed is thrust outward so that its velocity becomes equal to the circumferential velocity of the measuring-wheel and the linear velocity of the cloth, so that the impression takes place without forcible impact and without checking the motion of the cloth. Fractions of the units of length are indicated on a scale.

An example of the invention is illustrated in the annexed drawing in which—

Figure 1 is a section substantially on the line A—A of Fig. 2, but showing also certain parts 79, 31, 32, 40 which are in a more forward plane of the machine. Fig. 2 is a front view of the measuring and printing mechanism, and Fig. 3 a front view of the apparatus on a smaller scale, with the measuring board and supports. Figs. 4 to 12 are detail views. Fig. 4 being a detail view of part of the gearing. Fig. 5 a detail view of the inking mechanism operating gear. Fig. 6 an elevation of a releasing device for the "tens" carrier. Fig. 7 is view of the inking mechanism. Fig. 8 a section of the operating gear between the measuring wheel and the typewheel casing. Fig. 9 an elevation and Fig. 10 a section of an adjusting device for the type. Fig. 11 an elevation of the scale of fractions of a revolution. Fig. 12 a detail view of the action of the "tens" carrying pawl.

64 (Fig. 3) is a flat table or board over which the cloth passes, 60, 60 are two brackets thereon carrying the rod 59 on which the measuring and marking device slides. The latter comprises two side plates 1, 2 connected to one another by bolts 3, 4 and 5 and forming a frame for supporting the measuring and marking mechanism. The plates 1, 2, have holes 58 for passage of the rod 59. A bracket 62 attached to rod 59 by a pin 62$^a$ carries a set screw 63 bearing upon the lug 63$^a$ formed by the end of the plate 1 so that by adjustment of this screw 63 the frame may be adjusted in its distance from the surface of table 64.

Two circular parallel spiders 7 inter-connected by cross bars 8, form a rotary box, supported by two trunnions 6, 6$^a$ carried by the spiders 7, 7 respectively. The trunnion 6$^a$ has bearing in the socket 6$^b$ on plate 1, and the trunnion 6 turns in a sleeve 44 (Fig. 8) which has bearing in the plate 2. The box is thus rotatably journaled in the frame formed by plates 1, 2. The spiders 7 have sockets 7$^a$ for reception of an axle 9. The axle 9 thus mounted eccentrically in the box 7, 7, 8, is parallel with the trunnions 6, 6$^a$ and supports the typewheels 10 and 11 for units and tens respectively, the said typewheels being loose on the axle 9. Each of the typewheels is provided with two concentric flanges 12 and 13 perforated to serve as guides for the stems 15 of the types 14, the inner ends of said stems being preferably rounded. Springs 16 surrounding the stems 15 bear against the outer flange 13 and the pins 17 fixed in the stems 15. A sleeve 18 is adjustable on the axle 9, and is formed with a cam 19 located in the path of the stems 15 of both sets of type.

Each of the type-wheels is provided at its circumference with ten recesses 20. The recesses 20 in the type-wheel 11 are adapted to be engaged by the double-armed pawl 21 carried by a disk 21$^a$ frictionally held against toothed wheel 22, one arm of the pawl being normally pressed by the spring 23 against the pin 24 fixed to the toothed wheel. The latter has ten teeth and is rigidly connected to the toothed wheel 25 (Fig. 6) which also has ten teeth. The pin or tooth 78 is fixed to one of the spiders 7 adjacent a notch 26 in the edge of the spider (Fig. 6) and it engages the toothed wheel 22. The pawl 27, pivotally connected at 28 to the plate 1 is formed with a head 29 to engage the toothed wheel 25 except at that stage of the revolution of the spider 7 at which the head 29 has dropped into the notch 26. The dog 31 mounted on the bolt 3 is actuated by the spring 79 to engage one of the recesses 20 in the unit typewheel 10 when the revolution of the box 7, 7, 8, brings the part of the typewheel which lies nearest the periphery of the spiders 7 past the dog 31, the roll 32 mounted on this dog being in contact with the periphery of spider 7.

For accurately adjusting the type there is arranged on each spider 7 a radially movable slide 35 attached by screws 33ª and slot 33 and having laterally projecting lugs 36 (Figs. 9 and 10). The typewheels are provided with laterally projecting pins 38 located in the paths of the lugs 36. The abutments 39 and 40 fixed to the bolts 3 and 4 are located in the paths of the outer beveled ends of the slides 35, so that when the latter pass the said abutments the slides are inwardly deflected against the action of the springs 34. By this means the lugs 36 are removed from the paths of the pins 38. The abutment 39 co-acts with the typewheel 11, and the abutment 40 with the typewheel 10. The plate 41 fixed to the box 7 co-acts with the rubber roller 42 to form a brake.

The measuring-wheel 43 is fixed to the sleeve 44 rotatable on the trunnion 6, and the toothed pinion 45 integral with said sleeve 44 meshes with the toothed wheel 47, the latter being rotatable on a stub shaft 46 fixed to the plate 2. The disk 48 is fixed to the wheel 47, and the toothed segment 49 is fixed to the said disk (Fig. 4). The segment 49 is adapted to mesh with the toothed pinion 50 fixed to the axle 6. Notches 51 and 52 are formed in the disk 48 adjacent the ends of the toothed segment 49. To the axle 6 is fixed a plate 53 provided with projections 54 and 55 adapted to abut against the smooth part 48ª of the circumference of the disk 48 and thus prevent rotation of the axle 6, until the segment 49 engages the toothed pinion 50, at which moment the projection 55 enters the notch 52 and thus allows the axle 6 to be rotated. After a complete revolution of the pinion 50 the segment 49 passes out of mesh with the latter, and at this moment the notch 51 co-acts with the projection 54 and the plate 53 resumes the position in which it locks the axle 6. The measuring wheel revolves twice for each revolution of the printing cylinder.

A scale 56 is marked on the wheel 47 (Fig. 11) and coöperates with the pointer 57 fixed to the wall 2, to indicate fractions of a revolution.

On one of the spiders 7 is a toothed segment 65 to coöperate with the toothed wheel 66 of the inking mechanism 67 (Figs. 5 and 7). The latter comprises the two rubber-rollers 68 and 69, roller 68 and toothed wheel 66 being fixed to an axle 70. The roller 69 is rotated by friction with the roller 68 and dips into the ink-trough 71 and transfers ink to the roller 68, with which the types come into contact during their rotation. The axle 70 and rod 72 carrying the frame 72ª of the inking mechanism are supported at 73 and 74 by the plates 1 and 2. The knob 75 and spindle 76 allow of adjusting the pawl 21 in the zero position.

The measuring-wheel is preferably provided with spikes 43$^1$ adapted to engage cloth placed on the board 64, so that rotation of the wheel moves the cloth across the board. This rotation also actuates the toothed wheels 45 and 47, disk 48 and segment 49. When the segment engages the toothed wheel 50 the box 7, 7, 8, makes one revolution, during which the pin 78 rotates the wheel 22 through one tooth-space, the toothed wheel 25 being for that purpose temporarily released by the fact that the head 29 of the pawl 27 enters the notch 26. During the rotation of the box 7 the axle 9 of the typewheels revolves in a circle concentric with the axis of trunnions 6, 6ª, and the dog 31 engages one of the recesses 20 in the typewheel 10, thus causing the latter to make a partial rotation on the axle 9, so that one of the types is thrust outward into printing position by the cam 19. The pawl 21 does not engage a recess 20 in the typewheel 11 (the "tens" wheel) until the box 7 has nearly completed ten revolutions, the wheel 22 having then made one revolution. Preferably the pawl 21 engages the said recess somewhat before the tenth revolution of the box has been completed, that is to say, before the pawl head 29 has released the wheels 22 and 25; the typewheel 11 is thus rotated before the tooth 78 coacts with the tenth tooth of the wheel 22, and the actuation of the latter by the tooth 78 then brings the pawl 21 out of the path of the typewheel.

It is obvious that the successive actuation of the types 14 by the cam 19 causes the respective springs 15$^1$ to be compressed, and that when the types have cleared the cam the springs act on the pins 17 to restore the types to their normal positions.

In the zero or starting position the "0" types of both typewheels are thrust outward by the fact that their stems 15 are on the crest of the cam 19.

After any given number of revolutions below ten the "0" type of the "ten" wheel will again be in that position, whereas the unit-wheel will have been so rotated that the type indicating that number of revolutions, say "7", will project therefrom, and the number printed on the cloth will be "07". After ten revolutions the "ten" wheel will print "1" and the unit wheel "0", the number printed being "10".

During each revolution of the box the types to be thrust into printing position are inked by contact with the roller 68. When they arrive in their lowest position these types are traveling in the same direction and plane as the cloth, and with the same velocity. The numbers printed on the cloth indicate in meters the length that has traveled under the apparatus the centimeters being indicated on the scale 56 by the pointer 57. It is obvious that the apparatus can be constructed to measure by any other units of length.

What I claim as my invention and desire to secure by Letters Patent of the United States is:—

1. In apparatus for measuring and marking fabrics the combination of a measuring wheel, a casing, means whereby the latter is rotated at intervals by the revolution of the measuring wheel, an axle mounted within said casing in constant eccentricity with regard to the axis thereof, a typewheel loosely mounted on said axle and having recesses in its periphery, resiliently mounted types carried by said wheel, a dog carried by the casing and coacting with said recesses for imparting rotation to the typewheel through a determined distance at each revolution of said casing, carrying up devices on the casing and typewheel respectively for automatically adjusting the types and a cam on said axle for successively moving the types into printing position, substantially as described.

2. In apparatus for measuring and marking fabrics the combination of a measuring wheel, a casing, means whereby the latter is rotated at intervals by the revolution of the measuring wheel, an axle mounted within said casing in constant eccentricity with regard to the axis thereof, a type wheel loosely mounted on said axle, and having recesses in its periphery, resiliently mounted types carried by said wheel, a dog carried by the casing and co-acting with said recesses for imparting rotation to the type wheel through a determined distance at each revolution of said casing carrying up devices on the casing and type wheel respectively for automatically adjusting the types, a cam on said axle for successively moving the types into printing position and means for automatically inking the types of the type wheel during the revolution of the latter substantially as described.

3. In apparatus for measuring and marking fabrics the combination of a measuring wheel, a casing, means whereby the latter is rotated at intervals by the revolution of the measuring wheel, an axle mounted within said casing in constant eccentricity with regard to the axis thereof, a type wheel loosely mounted on said axle, and having recesses in its periphery, resiliently mounted types carried by said wheel, a dog carried by the casing and coacting with said recesses for imparting rotation to the type wheel through a determined distance at each revolution of said casing, carrying up devices on the casing and type wheel respectively for automatically adjusting the types a cam on said axle for successively moving the types into printing position, a scale and means for indicating on said scale fractions of units of length marked by said type wheel.

4. The combination with a surface adapted to carry the cloth, of a measuring and marking device comprising a measuring wheel adapted to be rotated over said surface, a casing adapted to be rotated at intervals by the revolution of said measuring wheel, a type wheel mounted within said casing in constant eccentricity with regard to the axis thereof and having peripheral recesses, a dog carried by the casing and coacting with said recesses whereby each revolution of the said casing causes rotation of the type wheel through a determined distance and means for vertically adjusting said measuring and marking device relatively to the cloth-carrying surface, substantially as described.

In witness whereof I have signed this specification in the presence of two witnesses.

GOTTLIEB BRAUCHLIN.

Witnesses:
   GEORG ROTH,
   A. LIEBERKNECHT.